Patented Nov. 16, 1948

2,453,788

UNITED STATES PATENT OFFICE

2,453,788

POLYMERIZATION OF OLEFINIC COMPOUNDS

Leonard Fallows and Eric Vernon Mellers, Spondon, near Derby, England, assignors, by mesne assignments, to Celanese Corporation of America, a corporation of Delaware No Drawing. Application September 21, 1944, Serial No. 555,206. In Great Britain September 7, 1943

Section 1, Public Law 690, August 8, 1946
Patent expires September 7, 1963

8 Claims. (Cl. 260—83)

This invention relates to polymerisation and especially to the polymerisation of methyl methacrylate and other compounds of the formula $CH_2=CR_1R_2$ where $R_1$ is a hydrogen atom or a lower alkyl group and $R_2$ is a univalent component which gives the monomer a higher di-pole moment than it would have if said component were replaced by a hydrogen atom.

For the catalytic polymerisation of methyl methacrylate it has hitherto been considered necessary to employ as catalyst a strongly oxidising substance such as a peroxide, and to conduct the reaction at elevated temperatures. We have now found, however, that polymerisation of this and other compounds of the class specified above can be effected in aqueous media containing sulphur dioxide without the addition of any oxidising catalyst and at ordinary temperatures, although the reaction is more rapid at elevated temperatures. This discovery is the more remarkable since sulphur dioxide, by virtue of its reducing action, would have been expected to inhibit rather than to polymerise the reaction in question. Indeed it is common when monomers such as methyl methacrylate are to be heated without polymerisation, to employ sulphur, under conditions in which sulphur dioxide is generated, to inhibit the polymerisation. Apart from the advantage of being able to conduct polymerisation at ordinary temperatures, the use of sulphur dioxide presents other important advantages over that of the usual peroxide catalysts. It is cheaper, more easily produced, more stable and attended by less danger in production, storage and use.

Preferably the monomer is insoluble in water and the best results have been obtained with nitriles or esters of acrylic acid or methacrylic acid, and within this class with methyl methacrylate.

The aqueous medium in which the polymerisation is carried out may comprise a water-soluble organic solvent for the monomer diluted with water to a sufficient extent to constitute a non-solvent for the polymer. By the use of such a reaction medium, the polymer may be obtained directly in the form of a powder and this is of considerable advantage when the polymer is subsequently to be used in a moulding operation. The proportion of water to solvent may vary from a proportion so high that the aqueous medium is only just capable of dissolving the monomer to a proportion such that the aqueous medium is a solvent for polymers of relatively low molecular weight but not for those of high molecular weight. Thus by control of the relative proportion of water and solvent in the aqueous medium the quality of the product precipitated can be controlled. Excellent results have been obtained using as the aqueous medium aqueous solutions of methanol, ethanol or iso-propanol. Other solvents for the monomer which may be so employed, diluted with water, include other liquid water-soluble alcohols, e. g. glycol and glycerol as well as water-soluble fatty acids, e. g. acetic acid.

Instead of employing an aqueous medium which is a solvent for the monomer, a non-solvent aqueous medium can be used the monomer being dispersed therein. Such a non-solvent medium may consist substantially of water or of a dilute aqueous solution of a solvent or non-solvent liquid for the monomer. The reaction medium may contain agents adapted to control the state of dispersion of the monomer or of the polymer, for example it may contain dispersing agents, protective colloids, surface tension controllers and pH controllers. The aqueous medium may have dissolved or dispersed in it plasticisers, colouring agents or other substances which it is desired to incorporate with the powder.

The catalyst may be formed by dissolving sulphur dioxide in the aqueous medium. When the aqueous medium is an aqueous solution of a solvent for the monomer the sulphur dioxide may be dissolved in the solvent before this is diluted with water or may be dissolved in the water with which the solvent is subsequently diluted. It is frequently more convenient instead of starting with free sulphur dioxide, to employ salts or other substances which yield sulphur dioxide in aqueous solution, for example, alkali-metal sulphites, and bisulphites including meta-bisulphites. Particularly valuable results have been obtained using potassium meta-bisulphite as the source of sulphur dioxide. The use of this salt compared with that of solutions made by dissolving sulphur dioxide directly in the aqueous medium appears to be attended by a suppression of, or a considerable reduction of, the usual induction period, an acceleration in the polymerisation and an absence of the variability in the rate of polymerisation which is sometimes encountered when sulphur dioxide is employed directly.

One method of carrying out the invention is as follows:

75 parts by weight of methyl methacrylate is dissolved in 320 parts of methanol and to this is added 600 parts of water containing in solution 0.5 to 5 parts of potassium meta-bisulphite. Polymerisation commences immediately. The reaction mixture is allowed to stand for 16 hours by which time a substantially quantitative yield of polymerised methacrylate in the form of a fine powder is obtained. The reaction may or may not be carried out in the dark, for instance it may be carried out in a vessel which is opaque or in a glass vessel in daylight or ordinary electric light. Exposure to ultra-violet radiation is unnecessary. If the meta-bisulphite be omitted or replaced by a catalyst of the peroxide type, e. g. benzoyl peroxide, no detectable polymerisation occurs even after standing for several weeks in the cold.

In a similar way to that described above the reaction can be carried out employing a solution of 100 parts of methyl methacrylate in 320 parts of ethanol or iso-propanol and adding to the solution 600 parts of water containing 0.5 to 5 parts of meta-bisulphite. When a plasticised product is required a suitable plasticiser, for example dibutyl phthalate can be dissolved in the alcohol, together with the monomer. In this case, the powder obtained may be less fine and may need grinding to reduce it to the desired degree of fineness, but as the product is very friable any grinding necessary can be accomplished with very little expenditure of power or time. Instead of the meta-bisulphite sodium sulphite may be employed in the same proportions. In this case polymerisation is apt to be less rapid than with the meta-bisulphite and may exhibit a substantial induction period.

As indicated above the polymerisation can also be effected using as the catalyst a solution made by passing sulphur dioxide directly into the aqueous medium or into a component thereof. The sulphur dioxide may be employed in proportions ranging from about 0.02% to 0.5% or more on the weight of the monomer. In this case also polymerisation is generally slower than when the meta-bisulphite is employed and may require as long as 20 hours in the cold. In one series of trials an induction period that varied with the proportion of sulphur dioxide employed was observed. 100 parts of the monomer were dissolved in 800 parts of methanol and to this was added 1000 parts of water containing the sulphur dioxide. The following table gives the times within which precipitation of the polymers began for various percentages of sulphur dioxide on the weight of the monomer:

| Per Cent $SO_2$ | Time |
|---|---|
| 10 | } 5 to 6 hours |
| 5 | |
| 2 | } within 1 hour |
| 1 | |
| 0.5 | } within 10 minutes |
| 0.1 | |
| 0.05 | } within 1 hour |
| 0.02 | |
| 0.01 | } not in 10 days |
| 0.005 | |

At elevated temperatures polymerisation is considerably accelerated and may be substantially complete in the course of several hours.

When conducting polymerisation in an aqueous medium which is a non-solvent for the monomer, the monomer is preferably dispersed with the aid of a dispersing agent which may, for example, be an alkali metal salt of a sulphated hydrocarbon of the paraffin series. Thus, for example, methyl methacrylate may be dispersed with the aid of a dispersing agent consisting substantially of sodium secondary-octadecyl sulphate, in water containing about 0.5 to 5% of the weight of the monomer of potassium meta-bisulphite. Polymerisation occurs in the cold. The polymerisation may be carried out on an aqueous dispersion of the monomer made without the aid of any dispersing agent the same proportion of catalyst to monomer being employed, and polymerisation again taking place in the cold.

The methyl methacrylate employed in the trials referred to above was made by adding acetone cyanhydrin to concentrated sulphuric acid in the presence of free sulphur, the reaction vessel being cooled during the addition, heating the resulting mixture to about 135° C., cooling it to about 70° C. adding methanol and a small proportion of water, together with tannic acid, and distilling. Water was added to the distillate to cause separation of the methyl methacrylate and this was then washed with water, dried and distilled. The fraction boiling between 100.2° C. and 100.3° C. was employed in the trials.

The process of the invention has been described with particular reference to the polymerisation of methyl methacrylate. It may, however, be applied to the polymerisation of other olefinic substances of the kind specified above. Thus for example in any of the processes described above, methyl methacrylate may be replaced by ethylacrylate, methacrylonitrile, or acrylonitrile. Styrene may also be polymerised by these methods.

Having described our invention, what we desire to secure by Letters Patent is:

We claim:

1. In a process for polymerizing in an aqueous medium a substance selected from the class consisting of esters and nitriles of acrylic and methacrylic acids to obtain a homo-polymer, the step of initiating the polymerization of the substance by means of potassium meta-bisulphite.

2. In a process for polymerizing in an aqueous medium a substance selected from the class consisting of esters and nitriles of acrylic and methacrylic acids to obtain a homo-polymer, the step of initiating the polymerization of the substance by means of potassium meta-bisulphite in the presence of a water-soluble alcohol.

3. In a process for polymerizing methyl methacrylate in an aqueous medium to obtain a homo-polymer, the step of initiating the polymerization of said methyl methacrylate by means of potassium meta-bisulphite.

4. In a process for polymerizing methyl methacrylate in an aqueous medium to obtain a homo-polymer, the step of initiating the polymerization of said methyl methacrylate by means of potassium meta-bisulphite in the presence of a water-soluble alcohol.

5. In a process for polymerizing acrylonitrile in an aqueous medium to obtain a homo-polymer, the step of initiating the polymerization of said acrylonitrile by means of potassium meta-bisulphite.

6. In a process for polymerizing acrylonitrile in an aqueous medium to obtain a homo-polymer, the step of initiating the polymerization of said acrylonitrile by means of potassium meta-bisulphite in the presence of a water-soluble alcohol.

7. In a process for polymerizing methacrylonitrile in an aqueous medium to obtain a homopolymer, the step of initiating the polymerization of said methacrylonitrile by means of potassium meta-bisulphite.

8. In a process for polymerizing methacrylonitrile in an aqueous medium to obtain a homopolymer, the step of initiating the polymerization of said methacrylonitrile by means of potassium meta-bisulphite in the presence of a water-soluble alcohol.

LEONARD FALLOWS.
ERIC VERNON MELLERS.

REFERENCES CITED

The following references are of record in the file of this patent:

UNITED STATES PATENTS

| Number | Name | Date |
|---|---|---|
| 2,097,263 | Strain | Oct. 26, 1937 |
| 2,383,055 | Fryling | Aug. 21, 1945 |